UNITED STATES PATENT OFFICE.

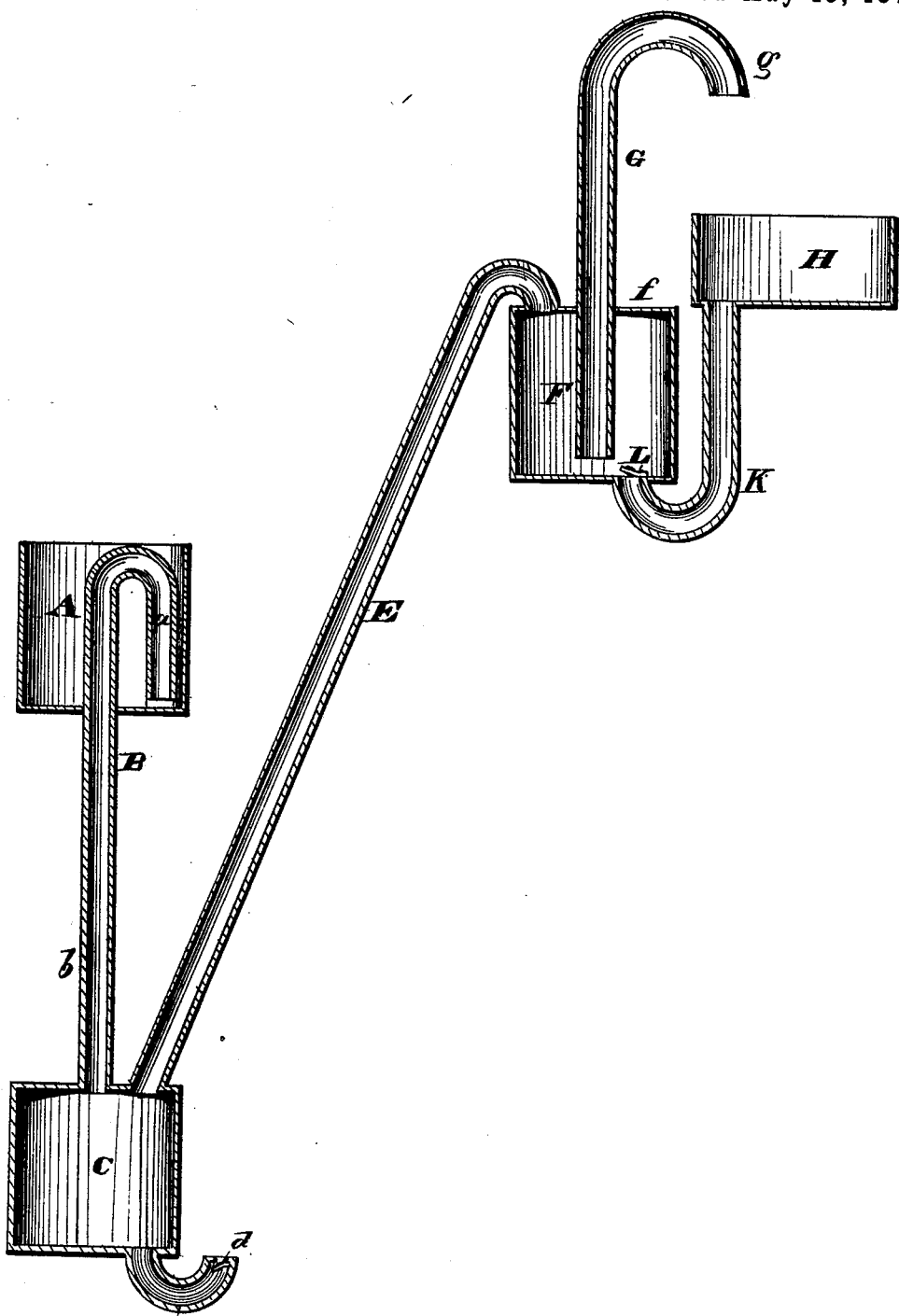

JAMES M. BOIS, OF SALAMANCA, NEW YORK.

IMPROVEMENT IN HYDRAULIC MOTORS.

Specification forming part of Letters Patent No. 190,700, dated May 15, 1877; application filed April 2, 1877.

*To all whom it may concern:*

Be it known that I, JAMES M. BOIS, of Salamanca, in the county of Cattaraugus and State of New York, have invented certain new and useful Improvements in Hydraulic Motors; and I do hereby declare the following to be a full, clear, and exact description of the invention, such as will enable others skilled in the art to which it pertains to make and use it, reference being had to the accompanying drawings, which form part of this specification.

My invention relates to certain improvements in hydraulic motors; and consists in a device suitable to actuate any desired connecting mechanism by intermittently producing a pressure within a close water-chamber provided with a discharge-pipe, whereby the water is periodically forced to any desired distance above the chamber, and caused to fall upon a water-wheel or similar power-actuating mechanism.

Water is first introduced into a lower air-chamber by means of an intermittently-flowing siphon, which displaces an equal volume of air therein, and causes the latter to pass up through a connecting passage into a water-chamber located in a plane above that of the highest point of the siphon. The water in this latter chamber is thus forced out by the incoming air-pressure, and caused to pass up and out through a discharge-pipe, from which its fall downward actuates a water-wheel suitably working below the same.

Means are provided for refilling the air and water pressure chambers, respectively, with air and water, so that upon exhausting the pressure in the said chambers the apparatus can automatically feed itself for a repetition of the power-actuating process.

Referring to the drawings, the view shows, in vertical section, a device embodying my improvement, in which—

A represents an open-topped vessel, of any desired dimension, into which is conducted the stream or volume of water, serving as the actuating medium of the motor. Within this vessel A a siphon, B, is placed, of construction such that while the lower extremity of its shorter leg $a$ reaches nearly to the bottom of the vessel A, its longer leg $b$ extends down any desired distance, when its lower end rigidly connects with an air-chamber, C, by which it is supported.

This latter chamber C is provided at its bottom with a short curved waste-pipe, D, having an upwardly-closing valve, $d$, at its discharge-opening. Connected with the top of the air-chamber, and freely communicating with its interior, is the air-pressure pipe E, which extends upward above the water-chamber A, and empties into the second water-chamber F through its close top $f$.

A water-discharge pipe, G, is supported in the close top of this chamber, whose lower extremity reaches nearly to the bottom of the latter, while its upper extremity is carried up and finally formed into a return bend, $g$, whose discharge-opening is above a third and uppermost water-chamber or receiving-tank, H. This latter tank H has an open top, similar to chamber A, while its bottom has a connecting-pipe, K, leading from the same by a circular bend to the bottom of water-chamber F. A downwardly-closing valve, L, controls the communication of this connecting-pipe with the water-chamber at its discharge-opening into the latter.

The water-chamber F is in a horizontal plane above the highest point of the siphon B, and the bottom of the receiving-tank H is in a plane above the top of the chamber F.

The water discharge-pipe G is of such vertical extension, both above the water-chamber F, and also above the receiving-tank H, that any desired fall of water can be obtained, and it is evident that said pipe may be of any length sufficient to give as great a motive power as called for in operating a water-wheel located between its discharge-opening and the receiving-tank H. Any suitable water-wheel may be used in this connection, which, with its connecting mechanism and engaging parts is not shown, as it forms no part whatever of my invention; and I do not desire to restrict myself to any special manner of constructing the same.

It is not necessary that I should employ the receiving-tank H, except in instance of using the same water over and over again in operating the closed water-chamber F, since, where circumstances permit, the tank may be omitted, and the water from discharge-pipe G falls directly from off the intermediate water-wheel into a free body of water located below the latter—such as a pond, stream, or other uninclosed volume of water. In this latter instance the close water-chamber F is placed within this free body of water, and the connecting-pipe K is not needed, since the valve L will open communication directly from this body of water into the chamber F.

No means of conducting the actuating stream of water into the chamber A is shown, since the same may be of any suitable character, provided only that the stream or volume of water thus emptying into the chamber shall be regulated in quantity so that it shall be less than the volume of water capable of being conducted through the siphon B. By thus causing the siphon to carry off a greater volume of water in a given time than can be introduced into the chamber A by its feeding-stream, it is evident that I obtain an intermittent or periodical motor-power in the actuation of the water-wheel.

In the operation of the device, the air-chamber C and passage D being filled with air by reason of the open valve $d$, and the close water-chamber F having been also filled with water through its valve L, water is fed into the chamber A. When the chamber becomes filled with water to a depth sufficient to carry the latter up over the joint communication between the short and long legs of the siphon the well-known mechanical principle of the siphon causes the water to be constantly conducted into the air-chamber C until the latter is emptied of its full supply, and air is again passed into the short leg of the siphon.

As water is conducted into chamber C the pressure within the latter necessarily following from such an induction closes the valve $d$, and causes a volume of air equal to that displaced by the inflowing water to be forced up through the air-passage pipe E. An equivalent pressure will be produced in chamber F, and the water therein contained will be forced up through the water-exit pipe G, and finally discharged over the water-wheel, and from thence falling into the tank H or body of water beneath the wheel.

When water is exhausted from chamber A and siphon B the pressure within the air-chamber C is removed, and the valve $d$, being in equilibrium, allows the water to empty out through the waste-pipe D. Air-pressure is, consequently, taken off from the chamber F, and the water therein is no longer forced up and out through the discharge-pipe G. The valve L is thus also placed in equilibrium, and water from the tank H flows through pipe K into the chamber F, thus again filling the latter.

The length of time intervening between the intermittent flowing of water in the siphon allows the air-chamber C to again fill with air after discharging all its water, and also allows the chamber F to again fill with water, the construction and capacity of the several parts being relatively such that the above-described air and water refilling operations in the respective chambers may take place.

Having thus fully described my invention, what I claim as new, and desire to secure by Letters Patent, is—

1. The hydraulic motor consisting, essentially, of an intermittently-flowing siphon, a final-discharge pipe, and an intermediate air-pressure chamber, with suitable connecting mechanism, substantially as described.

2. The combination of the intermittently-flowing siphon, water pressure chamber, and intermediate-connecting air-pressure chamber, the said chambers being provided with respective waste and feed water mechanism, substantially as described.

3. The combination, with the intermittently-flowing siphon and respective air and water pressure chambers, of a final-discharge pipe, the latter being adapted to operate a water-wheel or similar power-actuating mechanism, substantially as described.

In testimony that I claim the foregoing I have hereunto set my hand this 21st day of March, 1877.

JAMES M. BOIS.

Witnesses:
EDWARD KEATING,
SILAS STEVENS.